United States Patent
Sharony

(10) Patent No.: US 7,019,663 B2
(45) Date of Patent: Mar. 28, 2006

(54) RF TRACKING SYSTEM AND METHOD

(75) Inventor: Jacob Sharony, Dix Hills, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 302 days.

(21) Appl. No.: 10/215,998

(22) Filed: Aug. 8, 2002

(65) Prior Publication Data

US 2004/0027251 A1 Feb. 12, 2004

(51) Int. Cl.
*G08B 5/22* (2006.01)

(52) U.S. Cl. .................. 340/825.49; 340/10.1; 340/10.4; 340/524; 340/572.1; 340/825.72; 340/825.69; 340/574; 340/531; 340/539.1; 340/10.5

(58) Field of Classification Search ........... 340/825.49, 340/10.4, 524, 539.13, 572.1, 825.72, 825.69, 340/10.5, 574; 455/456.1, 574
See application file for complete search history.

(56) References Cited

U.S. PATENT DOCUMENTS

| | | | |
|---|---|---|---|
| 6,480,108 B1 * | 11/2002 | McDonald | 340/505 |
| 6,486,794 B1 * | 11/2002 | Calistro et al. | 340/825.49 |
| 6,552,661 B1 * | 4/2003 | Lastinger et al. | 340/572.1 |
| 6,738,628 B1 * | 5/2004 | McCall et al. | 455/456.1 |
| 2001/0036810 A1 * | 11/2001 | Larsen | 455/11.1 |
| 2002/0062385 A1 * | 5/2002 | Dowling | 709/230 |
| 2003/0104848 A1 * | 6/2003 | Brideglall | 455/574 |

* cited by examiner

*Primary Examiner*—Brian Zimmerman
*Assistant Examiner*—Vernal Brown
(74) *Attorney, Agent, or Firm*—Fay Kaplun & Marcin, LLP

(57) ABSTRACT

Described is a system and method for tracking an asset. The system may include an RF tag coupled to the asset; a wireless wide area network ("WWAN") including a plurality of transceivers and having a first coverage area; and a plurality of wireless local area networks ("WLAN"). Each of the WLANs has a second coverage area within the first coverage area. In addition, the system includes a computer which communicates with the WWAN and the WLANs. The computer generates a signal to be transmitted to the asset using a first transceiver of the WWAN. The asset receives the signal and generates a response signal; the asset transmits the response signal to a particular WLAN within which second coverage area the asset is located via a plurality of second transceivers. The computer determines the location of the asset within the second coverage area as a function of the response signal.

25 Claims, 4 Drawing Sheets

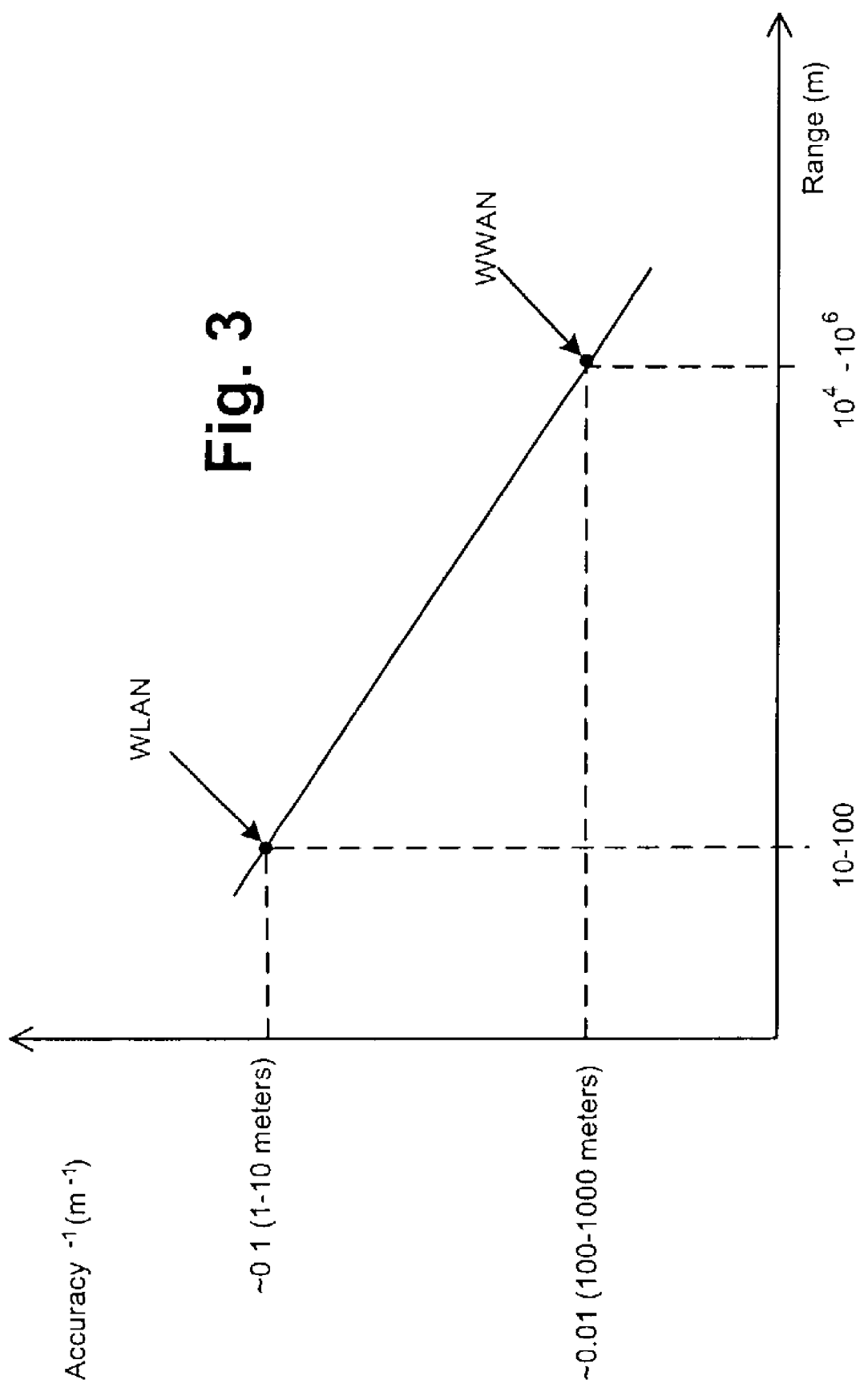

RF TRACKING SYSTEM AND METHOD

BACKGROUND INFORMATION

A conventional tracking system often utilizes Radio Frequency ("RF") tags attached to assets (e.g., a computer, a mechanical device, machinery, equipment, etc.) to identify, locate or track such assets. One of the major benefits of such an RF tracking system is that a line of sight ("LOS") between an RF reader or interrogator and the RF tag is not required for communication. This allows a large group of assets to be entered into the RF tracking system without any significant handling. In contrast to the RF tracking system, a bar code tracking system requires the LOS between a bar code reader and a bar code. Thus, either personnel or a mechanical asset is required to register the asset with the bar code tracking system. The registration may be done by, e.g., placing the bar code in front of the bar code reader.

Another advantage of the RF tracking system is that the RF tags are capable of surviving harsh and hostile environments, while the bar code may be easily damaged. These features make the RF tracking system more robust and easier to manage than the bar code tracking system.

However, even the RF tracking systems have disadvantages. For example, one of the disadvantages of the conventional RF tracking system is a trade-off between the accuracy in locating the RF tags and their operating range. The ability to locate remote or far away RF tags comes at the expense of accuracy in determining their location. A main contributor to this trade-off is a multipath spreading which is relatively significant in Wide Wireless Area Networks ("WWANs"). On the other hand, in Local Wireless Area Networks ("WLANs"), multipath signals are spread over a much smaller time range, and thus, the achieved accuracy is much greater. The problem with the WLANs is that it is inefficient to send requests to a large number of WLANs to determine a location of a particular asset with the RF tag. Therefore, there is a great need for a high-accuracy RF tracking system for locating remote or far-away assets having the RF tag.

SUMMARY OF THE INVENTION

Described is a system and method for tracking an asset. The system may include an RF tag coupled to the asset; a wireless wide area network ("WWAN") including a plurality of transceivers and having a first coverage area; and a plurality of wireless local area networks ("WLAN"). Each of the WLANs has a second coverage area within the first coverage area. In addition, the system includes a computer which communicates with the WWAN and the WLANs.

The computer generates a signal to be transmitted to the asset using a first transceiver of the WWAN. The asset receives a signal and generates a response signal; the asset transmits the response signal to a particular WLAN within which second coverage area the asset is located via a plurality of second transceivers. The computer determines the location of the asset within the second coverage area as a function of the response signal.

BRIEF DESCRIPTION OF DRAWINGS

FIG. 3 shows an exemplary graph which is indicative of characteristic differences of a Wireless Wide Area Network and a Wireless Local Area Network.

DETAILED DESCRIPTION

Figure 1:
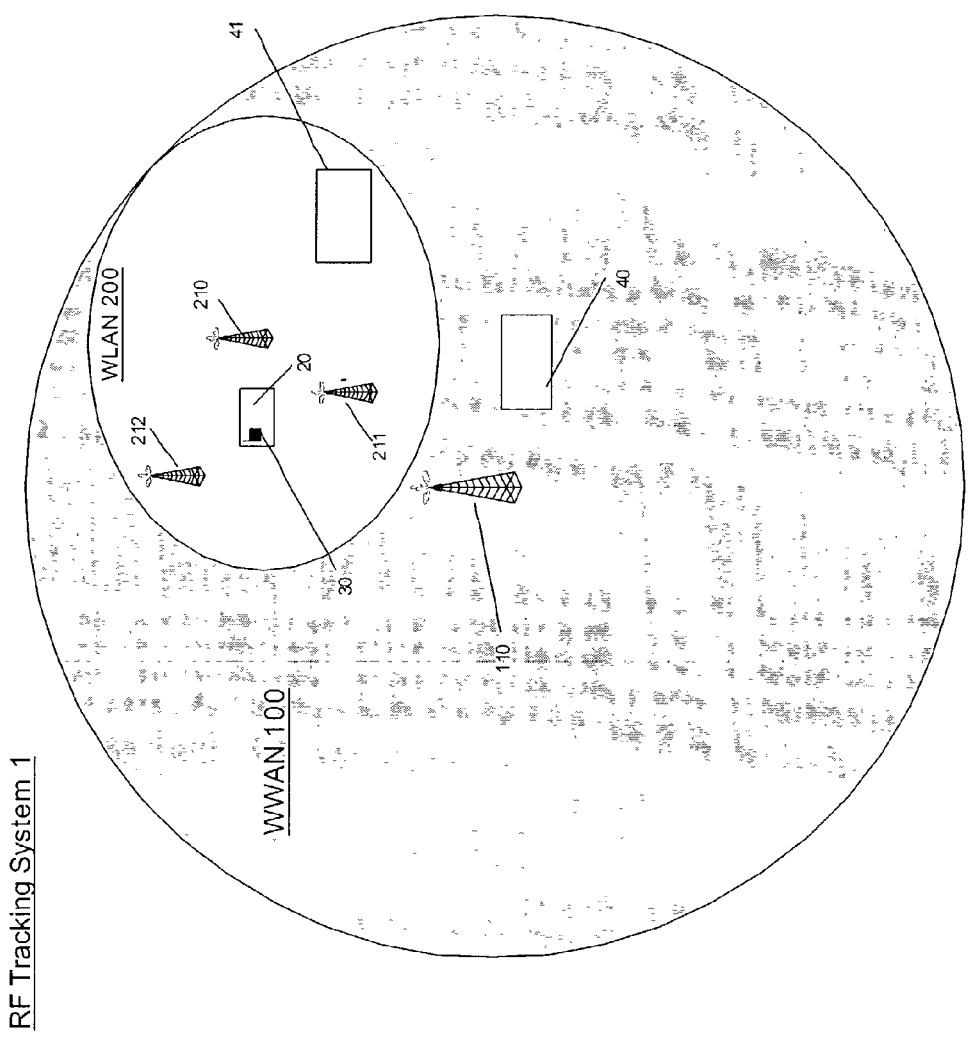
FIG. 1 shows an exemplary embodiment of an RF tracking system according to the present invention.

FIG. 1 shows an exemplary embodiment according to the present invention of an RF tracking system 1 for tracking the location of an asset 20 having an RF tag 30. The RF tracking system 1 may operate within a Wireless Wide Area Network ("WWAN") 100 which may include a plurality of Wireless Local Area Networks ("WLAN") (e.g. WLAN 200). The RF tag 30 may be a dual mode tag which can communicate with both the WWAN 100 and the WLAN 200.

The WWAN 100 may include a plurality of transceivers 110 and a first computer 40 or other processing devices. The transceiver 110 transmits and/or receives signals to and from the RF tags 30 within the coverage area of the WWAN 100. The first computer 40 may perform a plurality of functions, such as generate signals to be transmitted to the RF tag 30, analyze signals received from the RF tag 30, determine a location of the RF tag 30, etc. In particular, the transceiver 110 is capable of transmitting to the RF tag 30 a High Powered Message ("HPM") signal. The HPM signal is transmitted at a high power low bit-rate.

The WLAN 200 may be, e.g., a wireless system as described by IEEE 802.11b specifications. The WLAN 200 may include a plurality of transceivers 210, 211, 212 which communicate with a second computer 41. The second computer 41 communicates with the first computer 40. In particular, the transceiver 210 is capable of transmitting to the RF tag 30 a Low Powered Message ("LPM") signal. The LPM signal is transmitted at a low power high bit-rate. Those skilled in the art will understand that the first computer 40 and the second computer 41 may be combined into a single computing arrangement.

Figure 2A:
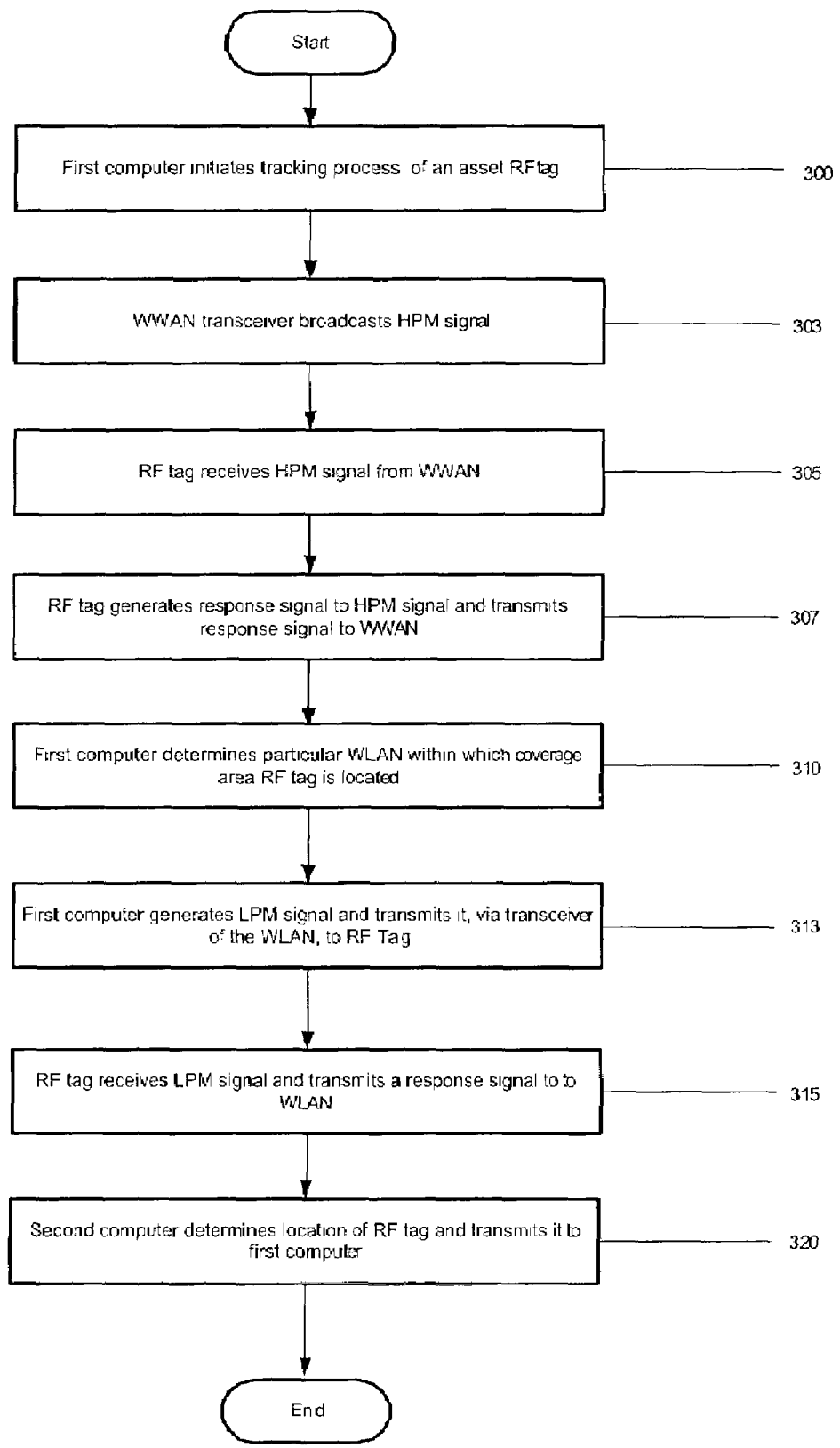
FIG. 2a shows an exemplary embodiment of a method according to the present invention.

FIG. 2a shows a flow chart describing a method according to the exemplary embodiment of the present invention utilized to locate the asset 20 having the RF tag 30. The method will be described with reference to FIG. 1. Those skilled in the art will understand that other systems having varying configurations, for example, different numbers of WWANs, WLANs, RF tags and assets may also be used to implement the exemplary method.

In step 300, the first computer 40 may initiate a tracking process of the asset 20 by generating the HPM signal. The HPM signal may include a plurality of data, e.g., an RF tag identification, an identifier of the asset 20, instructions to activate a response mode, etc. The HPM signal is transmitted to the transceiver 110 for broadcasting to the RF tag 30. In step 303, the transceiver 110 broadcasts the HPM signal (i.e., a high power low bit-rate signal/waveform) within the WWAN 100 coverage area. Typical specifications for the HPM are 1 Watt ("W") of power at a low bit rate of 10 kilobits per second ("Kbps"). The received Signal-to-Noise Ratio for the HPM is relatively low, thus allowing for the HPM signal to be received at large distances. As illustrated in FIG. 3, the HPM signal may allow location of the asset 20 with an accuracy of 100 to 1,000 meters.

In step 305, the RF tag 30 receives the HPM signal and generates a response signal. The response signal may include identification of the RF tag 30, time of reception of the HPM signal, etc. The response signal is transmitted back to the WWAN 100 (step 307). In particular, the transceiver 110 of the WWAN 100 receives the response signal and forwards it to the first computer 40.

In step 310, the first computer 40 processes the response signal to determine the WLAN 200 within which coverage area the RF tag 30 is located. Such determination, may be made as a function of data included in the HPM and response signals, time difference of arrival the response signals, a power measurement of the response signal, etc.

Subsequently, the first computer 40 generates the LPM signal to determine a precise location of the asset 20. The LPM signal may include the RF tag identification, etc. The LPM signal is lower power high bit-rate and may be broadcast to the asset 20 within the coverage area of the WLAN 200 using the transceivers 210–212 (step 313). Typical specifications for the LPM signal may be 100 milliwatts ("mW") of power at a high bit rate of upto 100 megabits per second ("Mbps"). As illustrated in FIG. 3, the LPM signal may allow location of the asset 20 with an accuracy of 1 to 10 meters.

In step 315, the RF tag 30 receives the LPM signal and generates a response. The response is transmitted to the WLAN 200. The transceivers 210–212 receive the response signal to LPM signal and transmit the response signal along with other data (e.g., such as time of receipt of the signal, power strength of the signal, etc) to the second computer 41. The second computer 41 processes the received data to determine a location of the RF tag 30 (e.g., X Y coordinates of the RF tag 30) and transmits it to the first computer 40 (step 320).

There are a number of ways of determining the location of the RF tag 30. For example, the location of the RF tag 30 may be determined by measuring a time difference of arrival ("TDOA") of the response signal. In particular, the transceivers 210–212 record the time when the response signal arrived at the corresponding transceiver. The arrival time of the response signal and location of each of the transceivers 210–212 are utilized by the second computer 41 to calculate the X Y coordinates of the RF tag 30.

In an alternative exemplary embodiment, the X Y coordinates may be determined using a power measurement reading of the response signal (i.e., a Received Signal Strength Indication ("RSSI") method). The RSSI method utilizes the intensity of the response signal and compares it with predetermined geographically marked points. For example, the WLAN 200 has a certain number of marked points; each point has a measured power reading. Then, the second computer 41 compares the powered reading of the response signal received by each of the transceivers 210–212 to the marked power reading. Based on this comparison, the X Y coordinates of the RF tag are determined.

Another method of determining the X Y coordinates of the RF tag 30 is similar to the first method described above, except that the RF tag 30 receives beacons from the transceivers 210–212 and records the time of reception and signal strength of these beacons. The reception time and the signal strength are included into the response signal and transmitted to the WLAN 200. The second computer 41 utilizes the data included in the response along with data received from the transceivers 210–212 (e.g., exact location of transceivers 210–212 and time when the beacons were transmitted to the RF tag 30) to calculate the X Y coordinates.

Figure 2B:
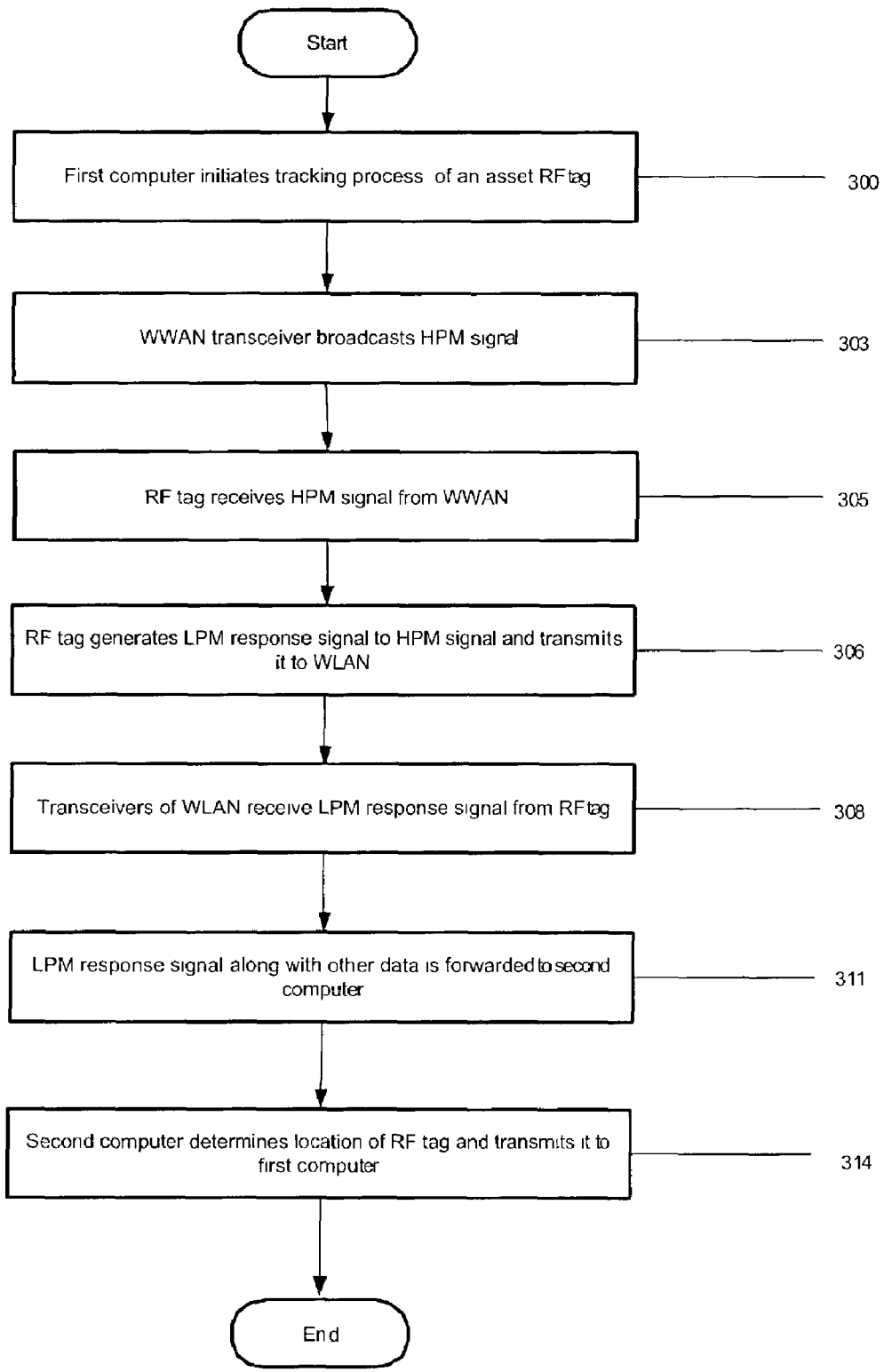
FIG. 2b shows another exemplary embodiment of a method according to the present invention.

FIG. 2b shows another exemplary embodiment of the method according to the present invention. According to this method, the steps 300—305 are substantially similar to those steps shown in FIG. 2a and described above.

In step 306, the RF tag 30 generates a response signal which is an LPM signal. The LPM response signal may include the RF tag identification, time of reception of the HPM signal, etc. The LPM response signal is transmitted to the WLAN 200.

The transceivers 210–212 of the WLAN 200 receive the LPM response and record the exact time of the reception (step 308). Then, the transceivers 210–212 forward the LPM response signal along with its geographical location and time of the reception to the second computer 41 (step 311). Based on the information provided, the second computer 41 calculates the X Y coordinates of the RF tag 20 utilizing one of the methods described above. The X Y coordinates then may be forwarded to the first computer 40. Those skilled in the art would understand that other data may be collected that would allow for the determination of a location of the asset 20, e.g., using one of the three above-described methods.

The present invention may be utilized in a plurality of industries. For example, it may be utilized for tracking the assets 20 in airports. First, the HPM signal is transmitted within the WWAN 200 which covers, e.g., the New York Metropolitan Area. The asset 20 having the RF tag 30 is located within the area which is covered by the WLAN 200, e.g., JFK International Airport. Then, the LPM signal is broadcasted to the RF tag 30 using the transceiver 210 of the WLAN 200. Based on the response signal to the LPM signal generated by the RF tag 30, the second computer 41 would be able to determine that the asset 20 is located at a specific location, e.g., Gate 11 in Terminal B.

Alternatively, the RF tag 30 may generate a LPM response signal to the HPM signal. The LPM response signal is transmitted to the WLAN 200. The second computer 41 of the WLAN 200 then determines the exact position of the RF tag 30.

The present invention has been described with reference to an embodiment having a single RF tag 30, the WWAN 100, the WLANs 200 and transceivers 110, 210–212 for each corresponding network. One skilled in the art would understand that the present invention may also be successfully implemented, for example, for a plurality of RF tags 30 and a plurality of the WLANs 200. Accordingly, various modifications and changes may be made to the embodiments without departing from the broadest spirit and scope of the present invention as set forth in the claims that follow. The specification and drawings are accordingly to be regarded in an illustrative rather than restrictive sense.

What is claimed is:

1. A system for tracking a location of an asset, comprising:
   an RF tag coupled to the asset;
   a wireless wide area network ("WWAN") including a first transceiver and having a first coverage area;
   a plurality of wireless local area networks ("WLAN"), each of the WLANs having a second coverage area within the first coverage area and a plurality of second transceivers; and
   a computer communicating with the WWAN and the WLANs, the computer generating a signal and transmitting the signal to the asset over the first coverage area using the first transceiver,
   wherein the RF tag is a dual-mode tag receiving communications from the WWAN and the WLANs, and
   wherein the RF tag receives the signal and generates a response signal to the signal, the response signal being transmitted to one WLAN of the plurality of WLANs, the RF tag being located within the second coverage area of the one WLAN, and
   wherein the second transceivers receive the response signal and forward it to the computer, the computer determining the location of the asset within the particular WLAN as a function of the response signal.

2. The system according to claim 1, wherein the computer determines the location of the asset as a function of at least one of the signal, a first reception time of the signal by the RF tag, a second reception time of the response signal by the second transceivers, a first power strength of the signal, a second power strength of the response signal and a location of each of the second transceivers.

3. The system according to claim 1, wherein the plurality of second transceivers includes at least three transceivers.

4. The system according to claim 1, wherein the WLAN is an IEEE 802.11 network.

5. The system according to claim 1, wherein the signal is a high power low bit-rate signal.

6. The system according to claim 1, wherein the response signal is a low power high bit-rate signal.

7. A computing arrangement for tracking a location of an asset having a RF tag, comprising:
a processor;
a memory device coupled to the processor; and
a communication device,
wherein the processor generates a signal and transmits the signal, via the communication device, to the asset using a first transceiver of a wireless wide area network ("WWAN"), the WWAN having a first coverage area,
wherein the RF tag is a dual-mode RF tag receiving communications from the WWAN and a wireless local area network ("WLAN"),
wherein the RF tag receives the signal and generates a response signal to the signal, the response signal being transmitted to the WLAN, the WLAN having a second coverage area which is within the first coverage area, and
wherein the WLAN receives the response signal via a plurality of second transceivers and forwards it to the processor, the processor determining the location of the asset within the second coverage area as a function of the response signal.

8. The computer arrangement to claim 7, wherein the processor determines the location of the asset as a function of at least one of the signal, a first reception time of the signal by the RF tag, a second reception time of the response by the second transceivers, a first power strength of the signal, a second power strength of the response signal and a location of each of the second transceivers.

9. The computing arrangement according to claim 7, wherein the signal is a high power low bit-rate signal.

10. The computing arrangement according to claim 7, wherein the response signal is a low power high bit-rate signal.

11. A method for tracking a location of an asset having an RF tag, the RF tag being a dual-mode tag receiving communications from a wireless wide area network ("WWAN") and a wireless local area network ("WLAN"), the asset being located within the "WWAN" the WWAN, the WWAN including a plurality of WLANs, the method comprising the steps of:
generating a signal;
transmitting the signal to the asset using a first transceiver of the WWAN;
receiving a response signal from the asset via a plurality of second transceivers of a particular one of the WLANs; and
determining the location of the asset within the particular WLAN as a function of the response signal.

12. The method according to claim 11, wherein in the determining step, the location of the asset is determined as a function of at least one of the signal, a first reception time of the signal by the RF tag, a second reception time of the response by the second transceivers, a first power strength of the signal, a second power strength of the response signal and a location of each of the second transceivers.

13. The method according to claim 11, wherein the signal is a high power low bit-rate signal.

14. The method according to claim 11, wherein the response signal is a low power high bit-rate signal.

15. A system for tracking a location of an asset, comprising:
an RF tag coupled to the asset;
a wireless wide area network ("WWAN") including a first transceiver and having a first coverage area;
a plurality of wireless local area networks ("WLAN"), each of the WLANs having a second coverage area within the first coverage area and including a plurality of second transceivers; and
a computer communicating with the WWAN and the WLANs, the computer generating a first signal and transmitting the first signal to the asset using the first transceiver,
wherein the RF tag is a dual-mode tag receiving communications from the WWAN and the WLAN;
wherein the RF tag receives the first signal and generates a first response in response to the first signal, the first response being transmitted to the WWAN,
wherein the computer determines a particular WLAN within which coverage area the asset is located as a function of the first signal and the first response, the computer generating a second signal and transmitting the second signal to the asset using the second transceivers of the particular WLAN,
wherein the RF tag receives the second signal and transmits a second response to the second signal to the particular WLAN, and
wherein the computer determines the location of the asset within the particular WLAN as a function of the second signal.

16. The system according to claim 15, wherein the computer determines the location of the asset as a function of at least one of the signal, a first reception time of the signal by the RF tag, a second reception time of the response by the second transceivers, a first power strength of the signal, a second power strength of the response signal and a location of each of the second transceivers.

17. The system according to claim 15, wherein the plurality of second transceivers includes at least three transceivers.

18. The system according to claim 15, wherein the WLAN is IEEE 802.11 network.

19. The system according to claim 15, wherein the first signal is a high power low bit-rate signal.

20. The system according to claim 15, wherein each of the second signal and the second response is a low power high bit-rate signal.

21. A computing arrangement for tracking a location of an asset having a RF tag, comprising:
a processor;
a memory device coupled to the processor; and
a communication device,
wherein the processor generates a first signal and transmits the first signal, via the communication device, to the asset using a first transceiver of a wireless wide area network ("WWAN"), the WWAN having a first coverage area, wherein the RF tag is a dual-mode tag receiving communications from the WWAN and a wireless local area network ("WLAN"), wherein the RF tag receives the first signal and generates a first response in response to the first signal, the first response being transmitted to the WWAN, wherein the processor determines a particular WLAN of a plurality of WLANs within which coverage area the asset is located as a function of the first signal and the first response, each of the WLANs having a second coverage area within the first coverage area and a plurality of second transceivers, wherein the processor generates a second signal and transmits, via the communication device, the second signal to the RF tag using the second transceivers;

wherein the RF tag receives the second signal and transmit a second response in response to the second signal to the particular WLAN, and wherein the processor determines the location of the asset within the second coverage area as a function of the second response.

22. The computing arrangement according to claim 21, wherein the computer determines the location of the asset as a function of at least one of the signal, a first reception time of the signal by the RF tag, a second reception time of the response by the second transceivers, a first power strength of the signal, a second power strength of the response signal and a location of each of the second transceivers.

23. The computing arrangement according to claim 21, wherein the first signal is a high power low bit-rate signal.

24. The computing arrangement according to claim 21, wherein each of the second signal and the second response is a low power high bit-rate signal.

25. A method for tracking a location of an asset having an RF tag, the RF tag being a dual-mode tag receiving communications from a wireless wide area network ("WWAN") and a wireless local area network ("WLAN"), the asset being located within the WWAN, the WWAN including a plurality of WLANs, the method comprising the steps of:

generating a first signal;

transmitting the first signal to the asset using a first transceiver of the WWAN;

receiving a first response from the asset, the first response being generated in response to the first signal;

determining a particular WLAN where the asset is located as a function of the first signal and the first response;

generating a second signal;

transmitting the second signal to the asset using a second transceiver of the particular WLANs;

receiving a second response from the asset to the second signal; and determining the location of the asset within the particular WLAN as a function of the second response.

* * * * *